(12) United States Patent
Tachauer et al.

(10) Patent No.: US 7,244,382 B2
(45) Date of Patent: Jul. 17, 2007

(54) FORMING DISCRETE REGIONS OF MOLTEN RESIN

(75) Inventors: Ernesto S. Tachauer, Bedford, NH (US); William P. Clune, Northwood, NH (US)

(73) Assignee: Velcro Industries B.V., Curacao (AN)

( * ) Notice: Subject to any disclaimer, the term of this patent is extended or adjusted under 35 U.S.C. 154(b) by 601 days.

(21) Appl. No.: 10/869,358

(22) Filed: Jun. 16, 2004

(65) Prior Publication Data

US 2005/0280175 A1    Dec. 22, 2005

(51) Int. Cl.
*B29C 47/06*    (2006.01)

(52) U.S. Cl. ............ 264/167; 264/171.13; 264/173.1; 425/121; 425/127

(58) Field of Classification Search ........... 264/167, 264/171.13, 173.1; 425/121, 127
See application file for complete search history.

(56) References Cited

U.S. PATENT DOCUMENTS

| | | | |
|---|---|---|---|
| 4,794,028 A | 12/1988 | Fischer | |
| 5,098,275 A * | 3/1992 | Kasai et al. | 425/145 |
| 5,669,120 A | 9/1997 | Wessels et al. | |
| 7,052,636 B2 * | 5/2006 | Ausen et al. | 264/145 |
| 7,056,462 B2 * | 6/2006 | Provost et al. | 264/145 |
| 2003/0085485 A1 | 5/2003 | Seidel et al. | |
| 2003/0087059 A1 | 5/2003 | Jackson et al. | |
| 2003/0087098 A1 | 5/2003 | Eaton et al. | |
| 2003/0104746 A1 | 6/2003 | Menzies et al. | |
| 2005/0206030 A1 * | 9/2005 | Clune et al. | 264/166 |

\* cited by examiner

*Primary Examiner*—Suzanne E. McDowell
(74) *Attorney, Agent, or Firm*—Fish & Richardson P.C.

(57) ABSTRACT

A method and apparatus for producing a fastener product having a multiplicity of fastener elements extending from a sheet-form material. Molten resin is extruded through an extrusion nozzle and gas is introduced into the resin within the extruder to provide an interrupted flow of resin from the nozzle to deposit discrete regions of molten resin onto the sheet-form material. The discrete regions of molten resin are spread apart along a longitudinal direction of the sheet-form material. The molten resin is permanently bonded to the sheet-form material, and a multiplicity of fastener elements are molded from each discrete region of resin.

56 Claims, 9 Drawing Sheets

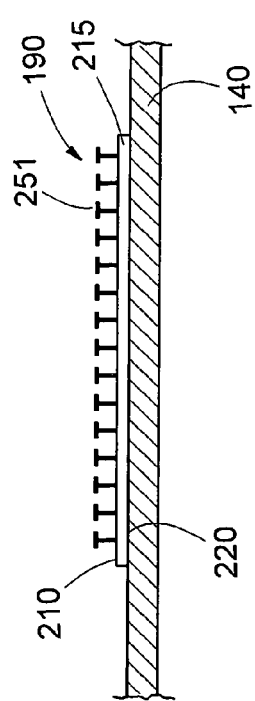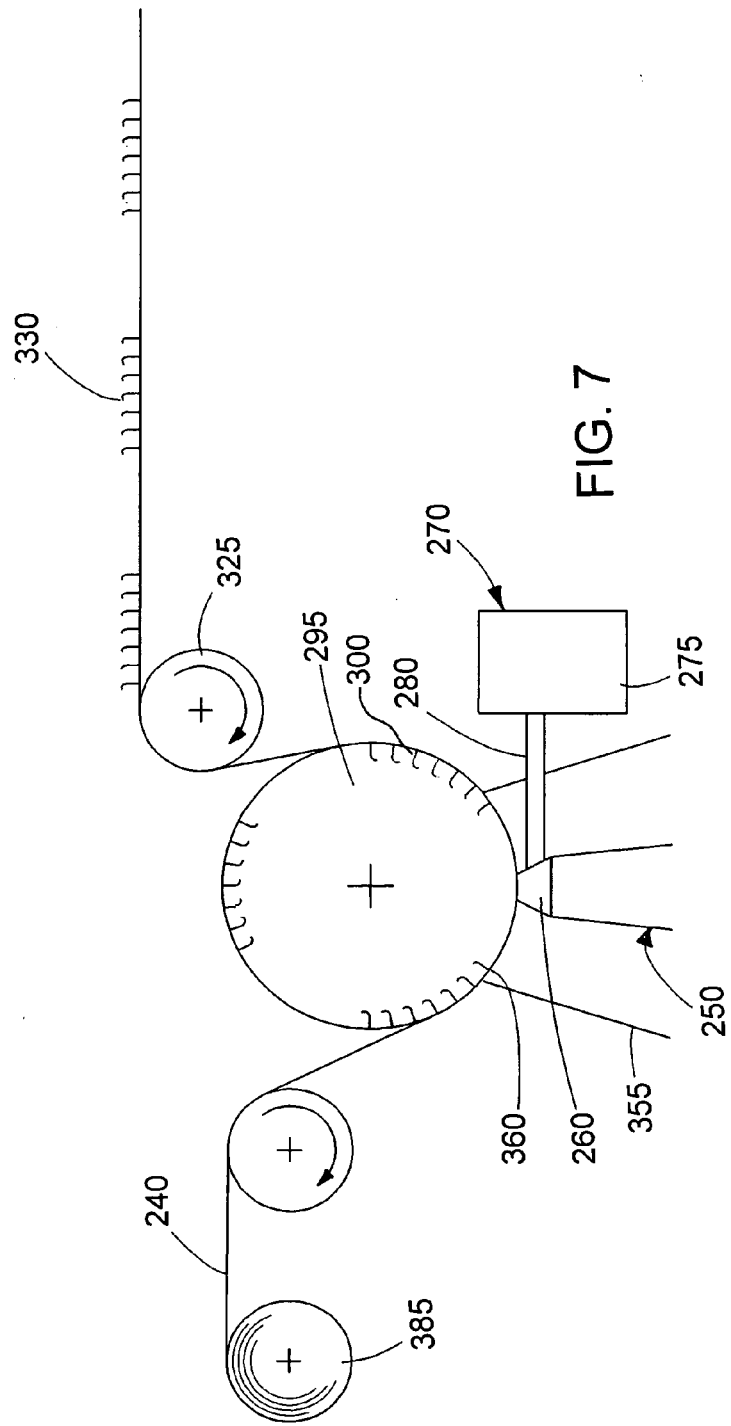

FORMING DISCRETE REGIONS OF MOLTEN RESIN

TECHNICAL FIELD

This invention relates to methods and apparatus for applying discrete regions of molten resin onto a substrate.

BACKGROUND

It is advantageous to form islands or discrete regions of resin on a substrate or sheet-form material, such as in the production of fastener products by continuous mold-rolling methods, such as disclosed in U.S. patent application Ser. No. 10/725,819 filed by Provost et al., for example.

Improved methods of generating discrete doses of molten resin are desired, such as for application to substrates, for the formation of fasteners and other products.

SUMMARY

In one aspect, a method of producing a fastener product having a multiplicity of fastener elements extending from a sheet-form material includes extruding molten resin through an extrusion nozzle of an extruder. Gas is introduced into the resin within the extruder to provide an interrupted flow of resin from the nozzle to deposit longitudinally spread apart discrete regions of molten resin onto the sheet-form material. The molten resin is permanently bonded to the sheet-form material. A multiplicity of fastener elements is molded from each discrete region of resin.

The gas can be introduced into the resin by injecting a gas in a gaseous state into the resin within the extruder. Similarly, gas can be introduced into the resin by injecting a liquefied gas that evaporates under conditions present in the extruder into the resin within the extruder. Gas can be introduced into the resin by injecting a liquid or solid into the resin within the extruder. The injected liquid or solid reacts under the conditions present in the extruder to produce a gas.

In some embodiments, the molten resin is extruded through multiple extrusion nozzles.

In some cases, the gas being introduced into the molten resin is pressurized to at least about 300 psi. The gas is pressurized to between about 300 and 2500 psi in some cases.

In some embodiments, the gas is introduced into the resin within the extrusion nozzle. The gas, in some cases, is introduced into the resin within about 2 inches of an outlet of the extrusion nozzle that is exposed to atmospheric pressure such that the resin is forced through the outlet.

In some embodiments the gas includes air and/or nitrogen.

In some cases, the gas is introduced under pressure into the resin through an injection nozzle at a uniform rate.

In some embodiments, the gas is formed by injecting a liquid that evaporates upon contact with the molten resin. In some embodiments, the gas is formed by injecting a solid that evaporates upon contact with the molten resin.

In some cases, the gas is introduced at a great enough rate with respect to a flow rate of the resin to separate the resin into discrete boluses. In some cases, the boluses have a mass of between about 1 milligram and 3 grams.

In some embodiments, the gas is injected into the molten resin at a frequency that corresponds to a longitudinal separation distance between the discrete regions of molten resin on the sheet-form material. In some embodiments, the longitudinal separation distance is at least about 0.5 millimeters.

In some cases, an orifice plate is attached to the extruder at the outlet of the extrusion nozzle to provide for the extrusion of multiple discrete regions of resin.

In some cases, the extrusion nozzle defines a resin flow area of about 0.05 square inches or less.

In some embodiments, the sheet form material comprises a loop material. In some, embodiments, the sheet-form material comprises a non-woven fabric. In some embodiments, the sheet-form material comprises a reinforcing scrim. In some embodiments, the sheet-form material is porous. In some embodiments, the sheet-form material comprises paper. In some embodiments, the sheet-form material comprises foam.

In some cases, the multiplicity of fastener elements are molded using a molding roll defining a plurality of cavities therein, the molten resin being introduced into the cavities of the molding roll. In some cases, the cavities are hook-shaped such that the molding roll molds a multiplicity of hook-shaped fastener elements. In some cases, the cavities are stem-shaped such that the molding roll molds a multiplicity of stem-shaped fastener elements. In some cases, the method further includes passing the stem-shaped fastener elements through a forming roll to create fastener elements having a stem and a substantially mushroom-shaped top.

In some embodiments, the molten resin is introduced into the cavities of the molding roll using a counter rotating pressure roll positioned adjacent to the molding roll. In some embodiments, the method further includes stripping the fastener elements from the molding roll. In some embodiments, the molten resin is introduced into the cavities of the molding roll by injecting the molten resin directly onto the molding roll. In some embodiments, the resin is bonded to the sheet-form material by pressure applied to the resin by the molding roll.

In another aspect, a method of producing a fastener product having a multiplicity of fastener elements extending from a sheet-form material includes extruding molten resin through an extruder having an extrusion nozzle. Gas is intermittently injected into the molten resin to create one or more discrete boluses of molten resin within the extrusion nozzle. The discrete boluses of molten resin are deposited onto a moving sheet-form material to create a plurality of discrete regions of molten resin thereon. The discrete regions of resin are separated longitudinally along the sheet-form material. The sheet-form material and discrete regions of molten resin thereon are fed into a nip between a molding roll and a counter rotating pressure roll to introduce the resin into hook-shaped cavities defined in a circumferential surface of the molding roll to form a multiplicity of fastener elements from each discrete region, and to permanently bond the resin to the sheet-form material. The resin is stripped from the hook-shaped cavities.

In some embodiments, the gas being injected into the molten resin is pressurized to at least about 300 psi. In some embodiments, the gas is pressurized to between about 300 and 2500 psi.

In some cases, the gas is injected into the resin within the extrusion nozzle. In some cases, the gas is injected into the resin within 2 inches of an outlet of the extrusion nozzle, the outlet being exposed to atmospheric pressure such that the resin is forced through the outlet.

In some embodiments, the gas comprises air and/or nitrogen.

In some cases, the gas is injected under pressure into the resin through an injection nozzle, the gas being injected at a uniform rate.

In some embodiments, the gas is injected into the molten resin at a frequency that corresponds to a longitudinal separation distance between the discrete regions of molten resin on the sheet-form material. In some embodiments, the longitudinal separation distance is at least about 0.5 millimeters.

In some cases, an orifice plate is attached to the extruder at the outlet of the extrusion nozzle to provide for the extrusion of multiple discrete regions of resin.

In some embodiments, the extrusion nozzle defines a resin flow area of about 0.05 square inches or less.

In some embodiments, the molten resin is introduced into the cavities of the molding roll by injecting the molten resin directly onto the molding roll.

In another aspect, an apparatus for producing a fastener product having a multiplicity of fastener elements extending from a sheet-form material includes an extruder, a pressurized gas assembly, a molding device, and a pressure device. The extruder has an extrusion nozzle, and contains a thermoplastic molten resin. The molten resin is extruded through the extrusion nozzle, which directs the extruded resin onto the sheet-form material. The pressurized gas assembly has an injection nozzle connected to the extruder. The injection nozzle is in communication with the resin within the extruder. The gas assembly intermittently injects pressurized gas into the resin within the extruder to interrupt flow of the resin through the extrusion nozzle to deposit discrete regions of the resin onto the sheet-form material. The molding device defines multiple cavities therein. The pressure device is positioned adjacent the molding device. The pressure device applies pressure to the sheet-form material and the discrete regions of the resin thereon to at least partially fill the cavities of the molding device with the discrete regions of the resin.

In some embodiments, the apparatus includes an orifice plate attached to the extruder at the outlet of the extrusion nozzle to provide for the extrusion of multiple discrete regions of resin.

In some cases, the extrusion nozzle defines a resin flow area of about 0.05 square inches or less.

In some embodiments, the molding device includes a molding roll. In some embodiments, the cavities are hook-shaped such that the molding roll molds a multiplicity of hook-shaped fastener elements. In some embodiments, the cavities are stem-shaped such that the molding roll molds a multiplicity of stem-shaped fastener elements.

In some cases, the apparatus includes a forming roll to create fastener elements having a stem and a substantially mushroom-shaped top.

In some embodiments, the pressure device comprises a counter rotating pressure roll positioned adjacent to the molding roll.

In some cases, the apparatus includes a stripping roll for stripping the fastener elements from the molding roll.

In some embodiments, the extruder is configured to extrude the molten resin directly onto the molding roll.

In some cases, the pressure applied by the pressure device bonds the resin to the sheet-form material.

In some embodiments, the extruder includes multiple extrusion nozzles.

Several aspects of the invention produce discrete regions of resin on a sheet-form material and a multiplicity of fastener elements extending from the resin. The discrete regions of resin can be spaced apart at predetermined distances and formed in predetermined shapes. Because the production of fastener elements can be restricted to only those regions where fastener elements are desired, the amount of resin required in the hook forming process is reduced. Furthermore, the rate at which fastener products can be produced is not greatly reduced.

In addition, a wide range of shapes and sizes of fastener elements can be attained using these methods. Therefore, the fastener elements produced can be utilized in a wide variety of applications.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a cross-section of a fastener product produced by the apparatus of FIG. 5.

FIG. 7 is a second alternative apparatus for producing fastener products that injects resin onto a mold roll.

Like reference symbols in the various drawings indicate like elements.

DETAILED DESCRIPTION

Figure 1:
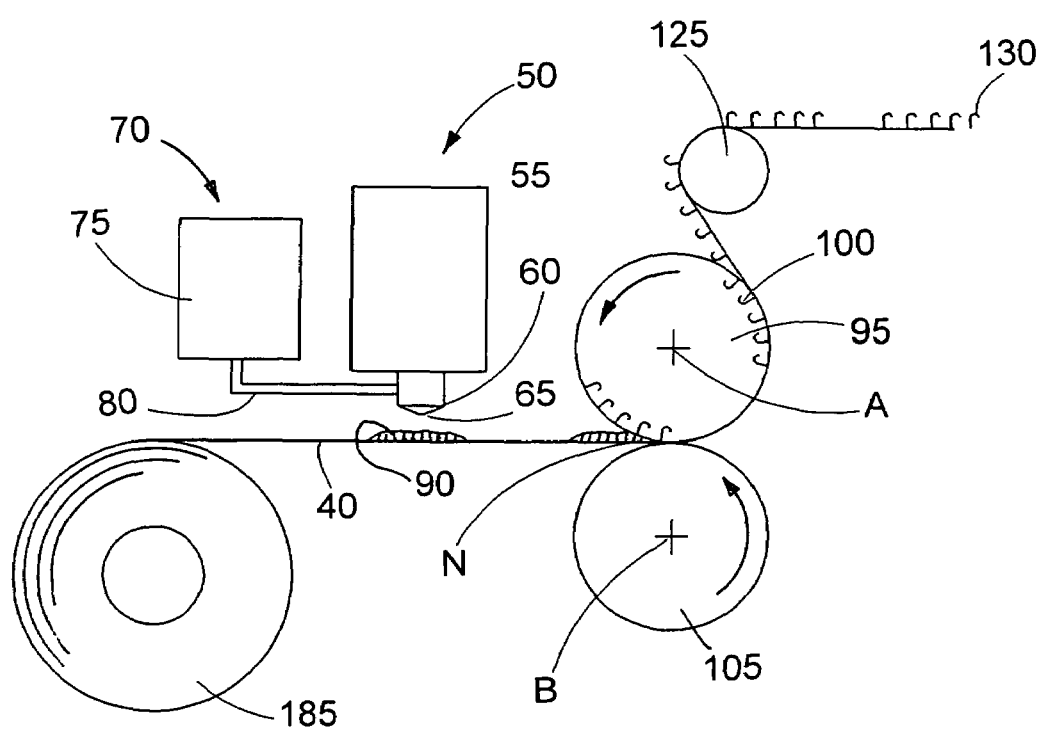
FIG. 1 is an apparatus for producing fastener products according to one aspect of the invention.

Referring to FIG. 1, an apparatus for molding continuous products includes an extruder 50, a gas compressor or gas cylinder 70, a sheet-form material 40, a molding roll 95, a counter-rotating pressure roll 105, and a stripping roll 125. Sheet-form material 40 is preferably held in tension between a roll 185 of sheet-form material, molding roll 95, and stripping roll 125. Sheet-form material 40 is conveyed between molding roll 95 and counter-rotating pressure roll 105, then around stripping roll 125. In one preferred embodiment, shown in FIG. 4, sheet-form material 40 is a loop material. Alternatively, any other suitable material may be used. For example, sheet-form material 40 may be a non-woven fabric, a reinforcing scrim, a porous material, paper, foam, foil, film, or other suitable materials.

Referring again to FIG. 1, extruder 50 includes a housing compartment 55 and an extrusion nozzle 60. Housing compartment 55 contains molten resin 52 (shown in FIGS. 2A and 2B). Molten resin 52 may comprise thermoplastics of various varieties, such as high density polyethylene. A suitable high density polyethylene is Exxon Mobil #6908, for example. Other suitable materials include low-density polyethylene (LDPE), linear low-density polyethylene (LL-DPE), polypropylene, polyurethane, nylon, and various combinations of the aforementioned materials. Molten resin 52 is extruded through extrusion nozzle 60. Extrusion nozzle 60 can be constructed of a metal material and preferably has an outlet 65 with a diameter of between about 1/100 and 1/2 inch, and more preferably between about 1/32 inch and 5/32 inch. Outlet 65 is open to atmospheric pressure and is directed toward sheet-form material 40. Thus, molten resin 52 is extruded through outlet 65 of extrusion nozzle 60 and deposited onto sheet-form material 40.

Still referring to FIG. 1, gas compressor or gas reservoir 70 includes a compressing compartment or storage compartment 75 and an injection nozzle 80. A gas 72 (shown in FIGS. 2A and 2B) is contained within compressing compartment 75. Gas 72 is preferably compressed to a pressure between about 100 psi and about 7000 psi. More preferably, gas 72 is compressed to between about 300 and 2500 psi. Any suitable device capable of providing pressurized gas may be used. Gas compressor 70 may be a typical gas compressor, a gas cylinder or a cryogenic gas production system, for example. Pressurized gas 72 is transported through injection nozzle 80 to extruder 50 where it is injected into molten resin 52. Pressurized gas 72 is preferably injected into extrusion nozzle 60 of extruder 50 within 1 inch of outlet 65. However, it may be injected into extrusion nozzle 60 at any point, or it may be injected into extruder housing 55.

Gas 72 is preferably air or nitrogen. However, other suitable gases or liquids are contemplated. For example, a liquefied gas that vaporizes at the process temperature may be used. Suitable liquefied gases include, for example, nitrogen, oxygen, and carbon dioxide ($CO_2$). Dry ice (solidified $CO_2$), can, for example, be used to produce gaseous $CO_2$ that can be injected into the resin. Similarly, a solid that vaporizes at the process temperature can be used. An example of a suitable solid is azodicarbonamide. The azodicarbonamide can, for example, be in the form of solid pellets.

Figure 2A:
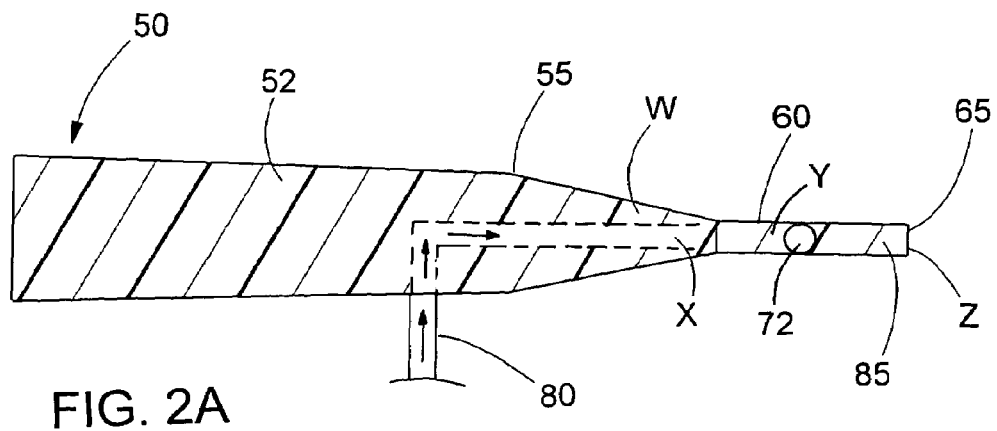
FIG. 2A is a cross-section of an extruder including an injection nozzle located near one end of an extrusion nozzle.

Referring to FIG. 2A, injection nozzle 80 is connected to extruder 50 to introduce bubbles of gas 72 into molten resin 52. Pressurized gas 72 is injected into molten resin 52 at a great enough rate and pressure to separate molten resin 52 into discrete boluses 85. Preferably, only one gas bubble is present in extrusion nozzle 60 at any one time. Accordingly, only one bolus 85 is present in extrusion nozzle 60 at any one time. Discrete bolus 85 of resin is then extruded through outlet 65 to form a discrete region 90 of resin on sheet-form material 40 (shown in FIG. 14). It is contemplated, however, that multiple gas bubbles and boluses may be present in nozzle 60 at one time.

A bubble of gas 72 is preferably injected into molten resin 52 every 1/10 second. As a result, one bolus 85 is formed in and extruded through the extrusion nozzle 60 every 1/10 second. However, depending on the desired distance between discrete regions 90 along the sheet-form material 40 and the desired size of boluses 85, this rate may vary.

The pressure of the gas 72 is preferably controlled by a solenoid valve (not shown). The valve is intermittently opened and closed to inject gas 72 into the molten resin 52 at a desired rate. Thus, in order to inject gas 72 into molten resin 52 at a rate of 1 injection per 1/10 second such that one discrete region 90 of molten resin 52 is extruded every 1/10 second, the valve is at least partially opened and closed every 1/10 second.

With continued reference to FIG. 2A, the pressure within extruder 50 varies throughout housing compartment 55. Gas 72 within injection nozzle 80 must be pressurized to a first pressure to prevent backflow of resin 52 into injection nozzle 80, and gas 72 can be pressurized to a second pressure in order to be injected into resin 52. The first pressure is achieved during a holding mode, while the second pressure is achieved during a pumping mode. By illustration, reference points W, X, Y, Z are shown in FIG. 2A, and an example of expected pressures within the extruder 50 is provided in the following table:

| Reference Point | Pressure Variance in Extruder (psi) | | | |
| --- | --- | --- | --- | --- |
|  | W | X | Y | Z |
| Holding Mode | 1500 | 1500 | 800 | 0 |
| Pumping Mode | 1500 | 1800 | 800 | 0 |

The gas injection can be performed by using a technique similar to blow-molding or Gas Assisted Injection Molding (e.g., GAIN®). GAIN®, for example, has been used to mold various thermoplastic products ranging from television cabinets to lawn chairs. During GAIN®, thermoplastic resin is injected into a proximal region of a mold, and then nitrogen is injected into the resin. As the nitrogen expands, it directs some of the resin toward a distal end of the mold and, at the same time, packs the resin against the walls of the mold. After the mold hardens in the shape of the mold, the nitrogen is removed from the mold.

Techniques utilizing principles of HELGA® can also be used. HELGA® has similarly been used to create various thermoplastic, thermoset, and rubber products, such as automotive equipment and furniture. During HELGA®, a liquid that vaporizes at the operating temperature and pressure of the extruder is injected into a melt flow of resin. The liquid is injected into the molten resin at a nozzle of the extruder. The resin is then deposited into a mold. The heat of the resin causes the liquid to evaporate and form a gas. The gas serves to force the molten resin against the walls of the mold.

Based on the principles discussed above with respect to HELGA®, a foaming agent, rather than a liquid, may be injected into the molten resin to form gas pockets within the resin. It is envisioned that one or more of many suitable gases, liquids, and foaming agents may be used.

Figure 2B:
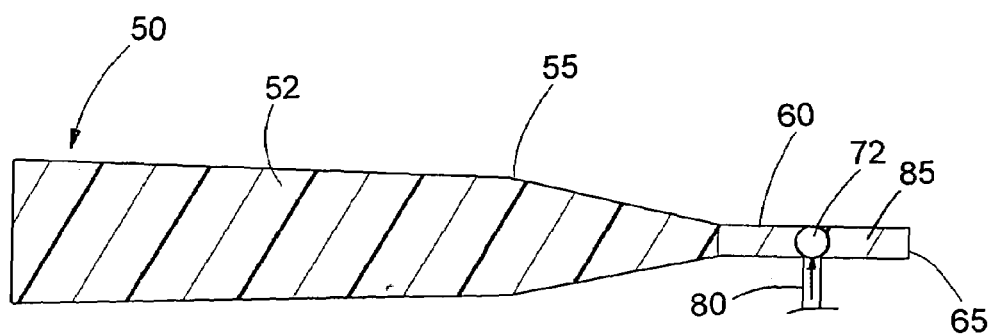
FIG. 2B is a cross-section of an alternative extruder including an injection nozzle located near one end of an extrusion nozzle.

As shown in FIG. 2B, injection nozzle 80 can be connected directly to extrusion nozzle 60. The bubbles of gas 72 are injected into the flow of molten resin 52 within extrusion nozzle 60 forming one or more discrete boluses 85 of resin. As discussed above, discrete boluses 85 of resin are extruded through extrusion nozzle 60 and onto the sheet-form material 40 to form discrete regions 90 of resin 52 (shown in FIG. 14).

Figure 14:
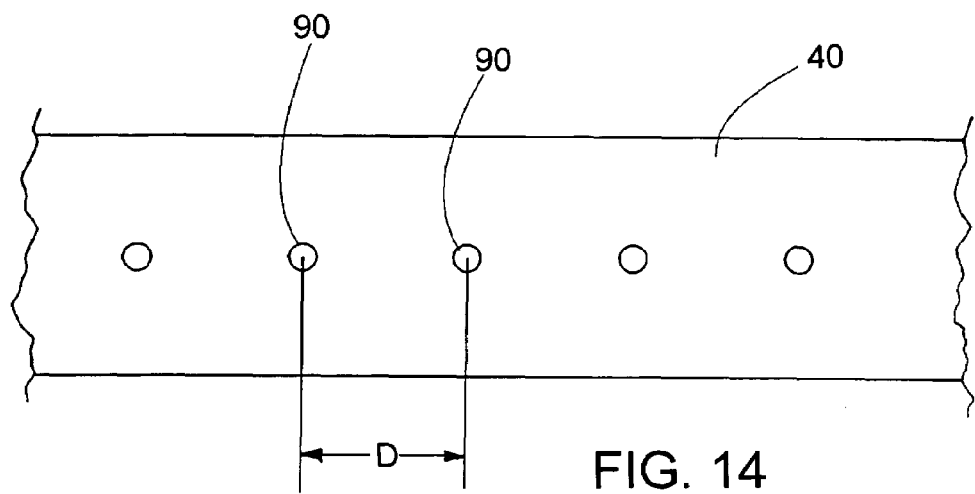
FIG. 14 is a plan view of a sheet-form material having discrete regions of resin thereon.

With continued reference to FIG. 14, discrete regions 90 of resin are preferably separated along a longitudinal direction of sheet-form material 40 by a separation distance D. Separation distance D is a function of the time interval between intermittent injections of gas into the extruder, the velocity of the molten resin through the extruder, and the velocity of sheet-form material 40. Thus, as the time interval between injections of the bubbles of gas decreases, the separation distance D between discrete regions 90 of resin concomitantly decreases. Similarly, as the time interval between injections of the bubbles of gas increases, the separation distance D between the discrete regions 90 of resin increases.

Referring to FIGS. 2A, 2B, and 14, the time interval between injections of gas 72 from the injection nozzle 80 is controlled by the solenoid valve (not shown). The longer the valve is held closed, the larger separation distance D between the discrete regions 90 will be. Similarly, the longer the valve is held open, the larger region 90 of molten resin will be. Bolus size and separation distance D are functions of the velocity of molten resin 52 within extruder 50 and the velocity of sheet-form material 40, in addition to the gas injection intervals. Furthermore, the size of regions 90 is dependent upon the size of boluses 85. Therefore, it is possible to control the size of regions 90 and separation distance D between regions 90 by manipulating the time interval between intermittent injections of gas 72, the velocity of molten resin 52 in extruder 50, and the velocity of sheet-form material 40.

Referring again to FIG. 1, molding roll 95 is cylindrical and contains mold cavities 100 formed within the circumferential surface. In one embodiment, fastener elements are molded in a continuous fashion as disclosed by Fischer in commonly-owned U.S. Pat. No. 4,794,028 (the full disclosure of which is hereby incorporated herein by reference as if fully set forth). Cavities 100 are preferably hook-shaped such that, when resin is introduced into cavities 100, a hook-shaped fastener element may be formed. However, cavities 100 can instead be formed about the circumferential surface of molding roll 95 as to produce preformed stems or other molded formations.

Pressure roll 105 can be positioned adjacent molding roll 95 such that axes of rotation A, B of rolls 95, 105, respectively, are substantially parallel to each other. This configuration creates a large amount of pressure at a nip N between rolls 95, 105 as they are rotated. In this configuration, sheet-form material 40 and the discrete regions 90 of molten resin 52 thereon are fed between molding and pressure rolls 95, 105. The pressure created at nip N between molding and pressure rolls 95, 105 is applied to sheet-form material 40 and discrete regions 90 of resin as they pass through nip N. The nip pressure fills mold cavities 100 with a first portion of discrete region 90 of molten resin to form a plurality of fastener elements, and a second portion of discrete region 90 of molten resin is compressed between the adjacent circumferential surfaces of pressure roll 105 and molding roll 95 to form a common base layer. As discussed below, this process creates a fastener having a common base layer from which a plurality of fastener elements extend. Rolls 95, 105 can also be adjusted to permanently bond the common base layer to sheet-form material 40.

Molding and pressure rolls 95, 105 can be internally cooled by cooled water, for example. Internal cooling of rolls 95, 105 facilitates solidification of molten resin 52 within cavities 100 promoting formation of the hook-shaped fastener elements or other molded formations.

After being fed through molding and pressure rolls 95, 105, sheet-form material 40 and discrete regions 90 of resin thereon are conveyed toward stripping roll 125. At this point, a common base layer has been formed from each discrete region 90 of resin. Due to the pressure within nip N, a first side of the common base layer is contained within cavities 100 and a second side of the common base layer opposite the first side is permanently bonded to sheet-form material 40. As sheet-form material 40 is trained around stripping roll 125, the first side of the common base layer is stripped from cavities 100 of molding roll 95 to expose a plurality of fastener elements.

Figure 3:
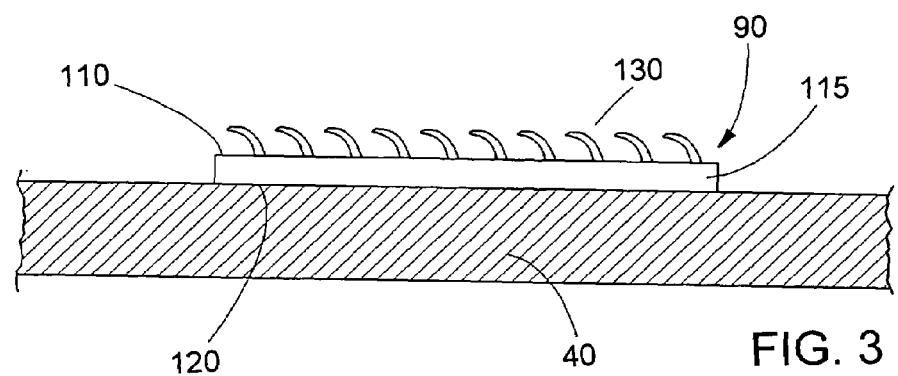
FIG. 3 is a cross-section of a fastener product produced by the apparatus of FIG. 1 having a multiplicity of fasteners extending from a sheet-form material.
Figure 4:
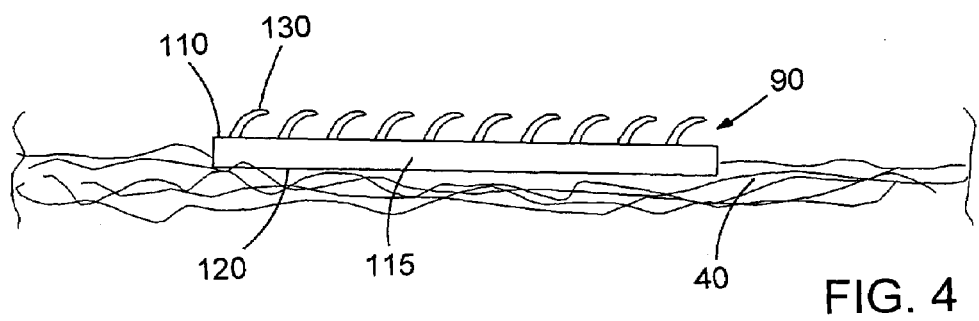
FIG. 4 is a cross-section of a fastener product produced by the apparatus of FIG. 1 having a multiplicity of fasteners extending from a loop material.

This process produces a fastener product as shown in FIG. 3. A number of fastener elements 130 extend from a first side 110 of a common base layer 115 of resin, and a second side 120 of common base layer 115 is permanently bonded to sheet-form material 40. Sheet-form material 40 can be a loop material, as shown in FIG. 4.

Figure 5:
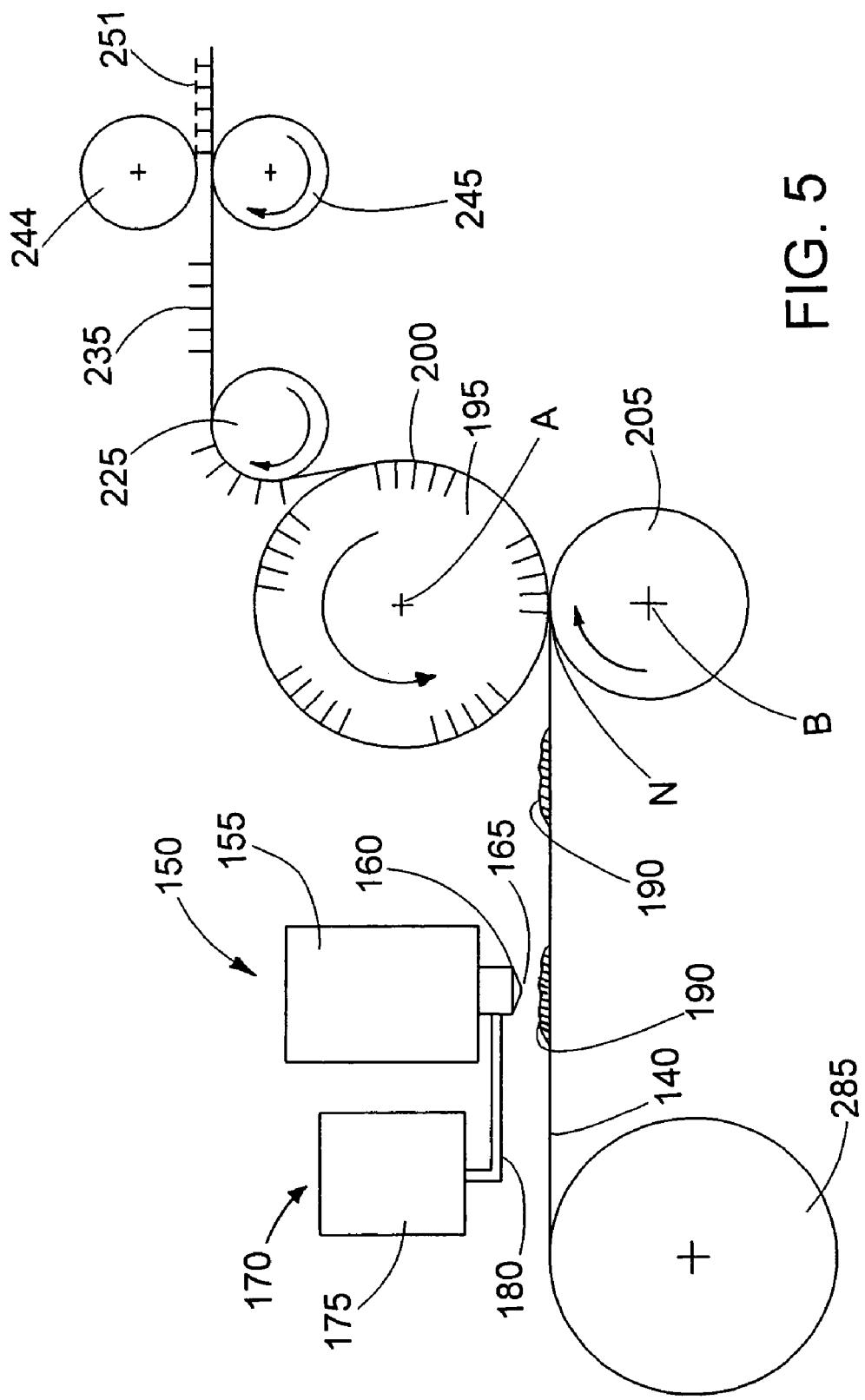
FIG. 5 is a first alternative apparatus for producing fastener products.

In an alternative embodiment, shown in FIG. 5, cavities 200 of mold roll 195 are stem-shaped. The process of the apparatus of FIG. 5 is similar to the process discussed above with respect to FIG. 1. A sheet-form material 140 is conveyed through nip N between molding roll 195 and pressure roll 205. The pressure within nip N forces a first portion of discrete region 190 into cavities 200, and simultaneously bonds a second portion of discrete region 190 to sheet-form material 140. Due to cavities 200 being stem-shaped, after being stripped from cavities 200, one side of discrete region 190 of resin forms a number of stem-shaped elements 235. Sheet-form material 140, along with stem-shaped elements 235, passes between upper and lower forming rolls 244, 245, respectively. Upper forming roll 244 depresses the top regions of stem-shaped elements 235 to form a multiplicity of mushroom-shaped fastener elements 251 generally extending in at least one lateral direction.

This process produces a fastener product, shown in FIG. 6, having a multiplicity of mushroom-shaped fastener elements 251 extending from a first side 210 of a common base layer 215 of resin, and a second side 220 of common base layer 215 is bonded to sheet-form material 140.

Figure 9:
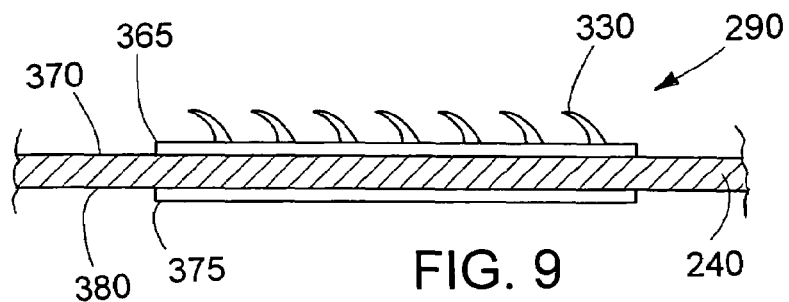
FIG. 9 is a cross-section of a fastener product produced by the apparatus of FIG. 7.

In one embodiment, shown in FIG. 7, extruder 250 includes an arcuate extruder housing 355 defining a predetermined gap 360 between extruder housing 355 and the circumferential surface of a molding roll 295. Molten resin is extruded through an extrusion nozzle 260 of extruder 250 and into gap 360. In this embodiment, a substantially porous sheet-form material 240 is fed through gap 360, is preferably a porous material. The porous material can, for example, be a scrim. As sheet-form material 240 is conveyed around molding roll 295, extruder 250 forces molten resin both onto and through sheet-form material 240. Due to the porosity of sheet-form material 240, a first portion of the extruded resin passes through sheet-form material 240 and into cavities 300 disposed within molding roll 295 while a second portion of resin adheres to an underside of sheet-form material 240. Thus, as shown in FIG. 9, a fastener product having a top layer 365 of resin bonded to an upper surface 370 of sheet-form material 240 and a bottom layer 375 of resin bonded to a lower surface 370 of sheet-form material 240 is produced. A number of hook-shaped fastener elements 330 extend from top layer 365 of resin. Alternatively, fastener elements 330 can be stem-shaped, as described above with respect to FIG. 5, mushroom-shaped, or any other suitable shape.

Figure 8:
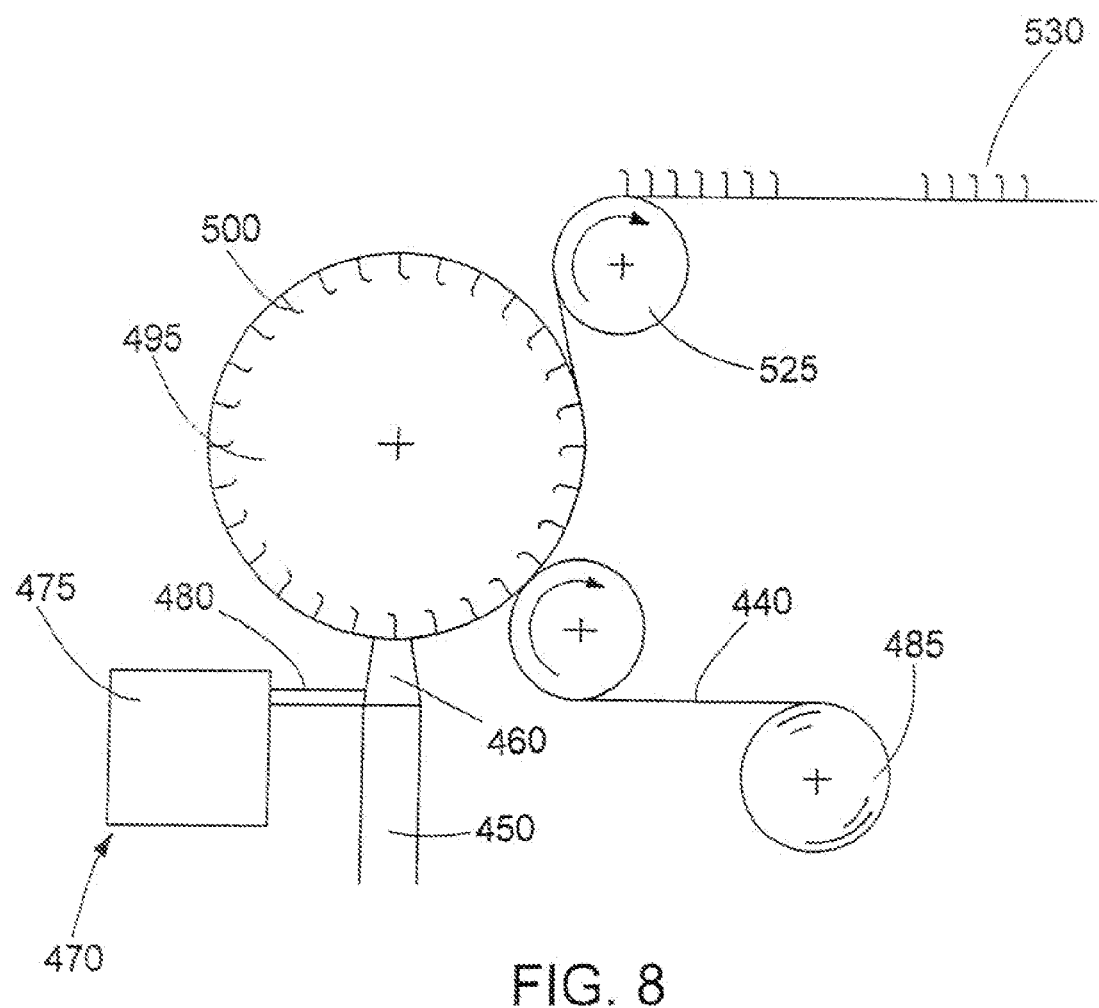
FIG. 8 is a third alternative apparatus for producing fastener products that injects resin onto a mold roll.

As shown in FIG. 8, an extruder 450 extrudes molten resin directly onto a molding roll 495 and, thereby, into mold cavities 500 of molding roll 495. A sheet-form material 440 is then brought into contact with the molten resin that is attached to mold roll 495, and the molten resin along with the sheet-form material 440 are conveyed toward a stripping roll 525. Eventually, the molten resin is stripped from cavities 500 by stripping roll 525 to expose an array of fastener elements 530 extending from a common base layer of resin. This process produces a fastener product that is similar to the product shown in FIG. 3. However, the molten resin is preferably bonded to only one side of sheet-form material 440.

Figure 10:
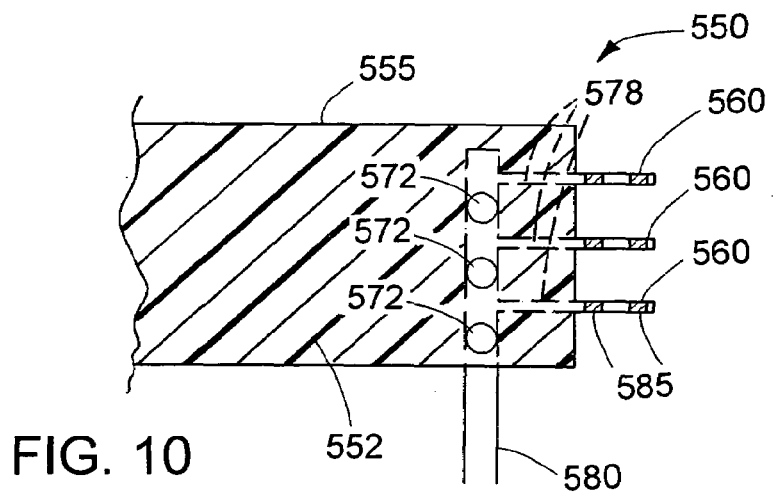
FIG. 10 is a cross-section of an extruder having a plurality of extrusion nozzles.
Figure 11:
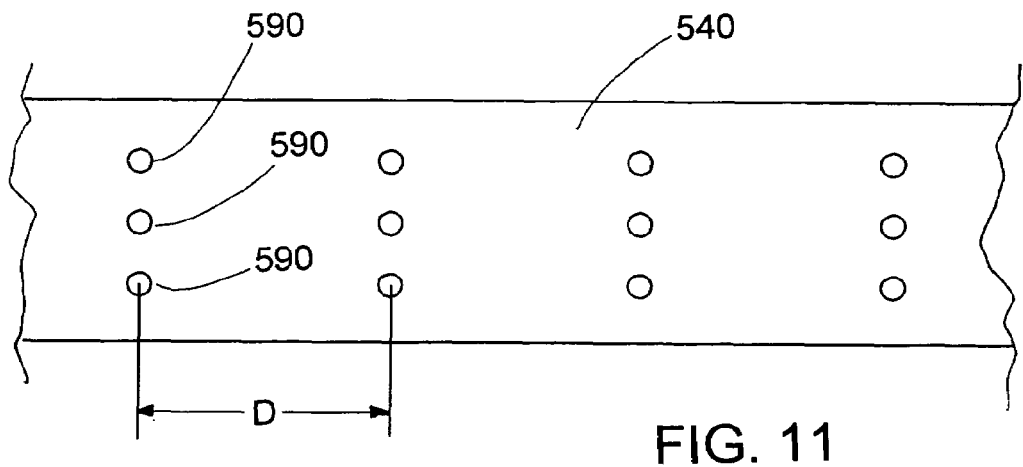
FIG. 11 is a plan view of a sheet-form material having a plurality of discrete regions of resin thereon.

Referring to FIG. 10, an extruder 550 includes an array of extrusion nozzles 560. An array of injection nozzles 578 is manifolded to port 580 and configured to inject bubbles of gas 572 into molten resin 552 at a point near an inlet of each extrusion nozzle 560. Molten resin 552 is extruded through extruder 550 and into extrusion nozzles 560 in the same manner as discussed above. Bubbles of gas 572 are intermittently injected into resin 552 at a point near the inlet of each nozzle 560 to create one or more discrete boluses 585 of molten resin within each nozzle 560. Discrete boluses 585 of molten resin are then deposited onto a sheet-form material 540 to form a plurality of discrete regions 590 of molten resin, as shown in FIG. 11. The process may then continue in accordance with any of the embodiments discussed above to form a plurality of fastener elements extending from each discrete region 590 of resin along sheet-form material 540.

Figure 12:
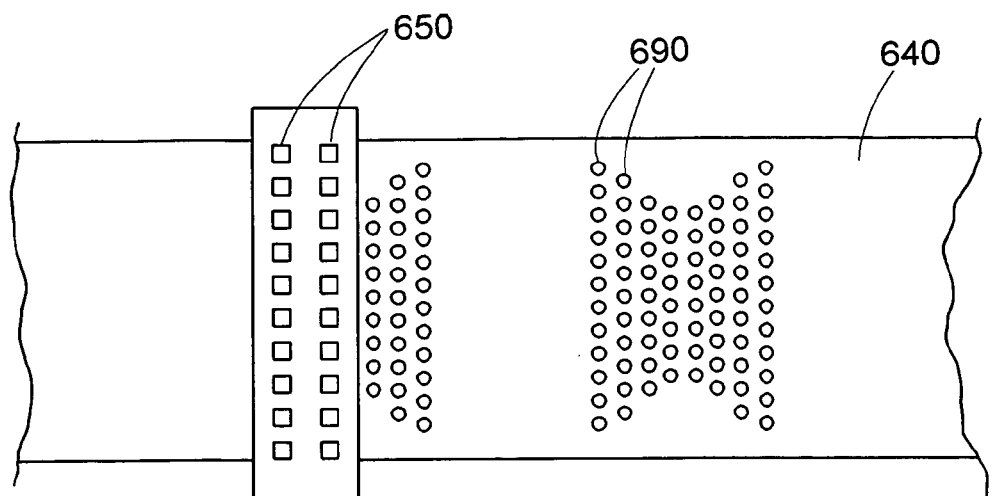
FIG. 12 is a plan view of a sheet-form material having a plurality of discrete regions arranged in a desired shape.

Referring to FIG. 12, an array of extruders 650 forms a predetermined pattern of discrete regions 690 on a sheet-form material 640. The array of extruders 650 preferably comprises two rows having 10 extruders each. With gas intermittently injected every 1/10 second, this arrangement allows for the production of 200 regions 690 of resin per second. As a result, 200 hook islands or fastener regions can be formed per second. Of course, any number of extruders 650 in any suitable arrangement is contemplated. Sheet-form material 640 is preferably conveyed at about 100 ft/min. Thus, the center regions 690 are longitudinally separated along sheet-form material 640 by approximately 2 inches. Altering the speed of sheet-form material 640 or the rate at which gas is injected can alter this separation distance.

In order to extrude resin to form predetermined shapes of fastener regions, each extruder 650 is equipped with a computer-controlled solenoid valve (not shown). Each valve is programmed to intermittently open and close such that the array of extruders 650 extrude a number of discrete regions 690 which form a desired shape on sheet-form material 640. In the example shown in FIG. 12, extruders 650 near the center of sheet-form material 640 are programmed to extrude resin more frequently than extruders 650 near the edges of sheet-form material 640. The result is an hour-glass shaped fastener region formed from the aggregation of discrete regions 690 of molten resin. By varying the number of individual extruders 650 and the frequency with which the valves are opened, any number of differently shaped fastener regions can readily be formed.

Figure 13:
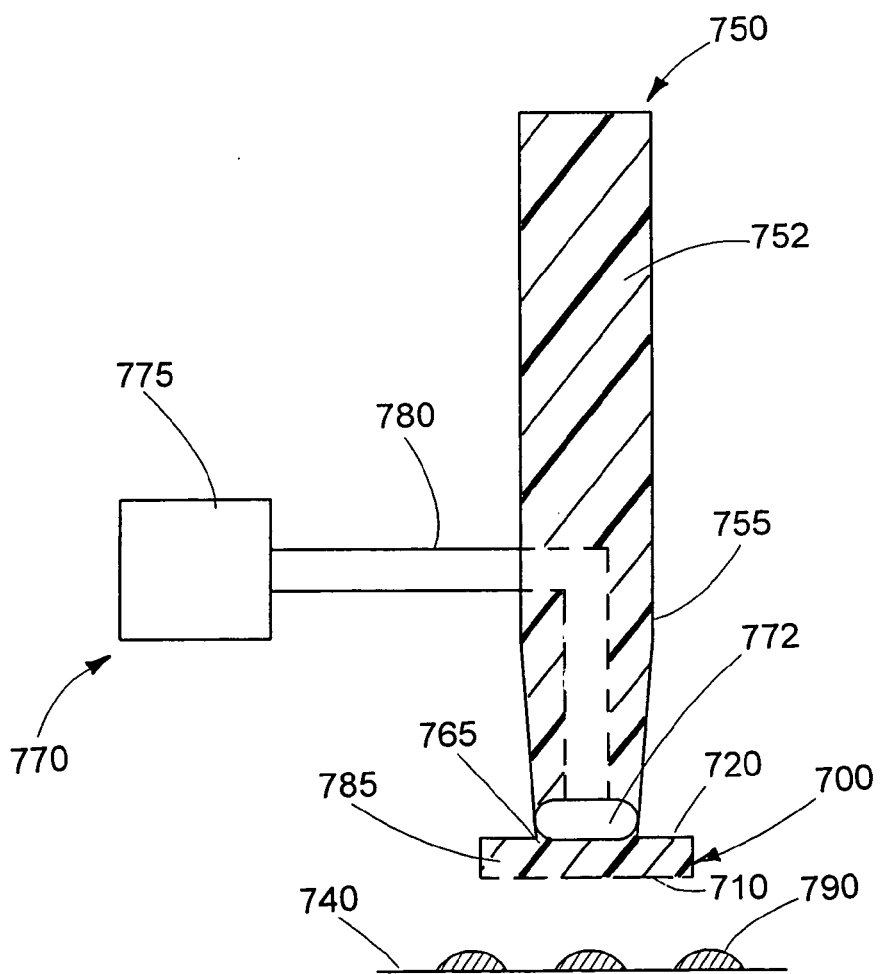
FIG. 13 is a cross-section of an extruder having an orifice plate mounted at an outlet of the extruder.

As shown in FIG. 13, an orifice plate 700 is attached to an outlet 765 of an extruder 750. Orifice plate 700 comprises multiple orifices 710 through which molten resin is extruded. A predetermined amount of gas or liquid or foaming agent 772 is injected into molten resin 752 near outlet 765 for controlled interruption of the flow of resin from the extruder. As a result, a relatively large bolus 785 of molten resin is formed within a cavity 720. Bolus 785 is forced by pressure from extruder 750 into cavity 720 within orifice plate 700, and then continued pressure forces some of resin 752 through orifices 710 and onto a sheet-form material 740. This arrangement reduces the number of valves required to produce the array of regions 790 of molten resin, because only one valve is required per capillary plate. In many cases it will be possible to provide an orifice plate having a suitable number and arrangement of orifices corresponding to a desired, predetermined fastener shape. A number of embodiments of the invention have been described. Nevertheless, it will be understood that various modifications may be made without departing from the spirit and scope of the invention. Accordingly, other embodiments are within the scope of the following claims.

What is claimed is:

1. A method of producing a fastener product having a multiplicity of fastener elements extending from a sheet-form material, the method comprising:
   extruding molten resin through an extrusion nozzle of an extruder;
   introducing gas into the resin within the extruder to provide an interrupted flow of resin from the nozzle to deposit discrete regions of molten resin onto the sheet-form material, the discrete regions being spread apart along a longitudinal direction of the sheet-form material;
   permanently bonding the molten resin to the sheet-form material; and
   molding a multiplicity of fastener elements from each discrete region of resin.

2. The method of claim 1, comprising extruding resin through multiple extrusion nozzles.

3. The method of claim 1, wherein the gas being introduced into the molten resin is pressurized to at least about 300 psi.

4. The method of claim 3, wherein the gas is pressurized to between about 300 and 2500 psi.

5. The method of claim 1, wherein the gas is introduced into the resin within the extrusion nozzle.

6. The method of claim 5, wherein the gas is introduced into the resin within about 2 inches of an outlet of the extrusion nozzle, the outlet being exposed to atmospheric pressure such that the resin is forced through the outlet.

7. The method of claim 1, wherein the gas comprises air.

8. The method of claim 1, wherein the gas comprises nitrogen.

9. The method of claim 1, wherein the gas is introduced under pressure into the resin through an injection nozzle, the gas being introduced at a uniform rate.

10. The method of claim 1, wherein the gas is formed by injecting a liquid that evaporates upon contact with the molten resin.

11. The method of claim 1, wherein the gas is formed by injecting a solid that evaporates upon contact with the molten resin.

12. The method of claim 1, wherein the gas is introduced at a great enough rate with respect to a flow rate of the resin to separate the resin into discrete boluses.

13. The method of claim 12, wherein the boluses have a mass of between about 1 milligram and 3 grams.

14. The method of claim 1, wherein the gas is injected into the molten resin at a frequency that corresponds to a longitudinal separation distance between the discrete regions of molten resin on the sheet-form material.

15. The method of claim 14, wherein the longitudinal separation distance is at least about 0.5 millimeters.

16. The method of claim 1, wherein an orifice plate is attached to the extruder at the outlet of the extrusion nozzle to provide for the extrusion of multiple discrete regions of resin.

17. The method of claim 1, wherein the extrusion nozzle defines a resin flow area of about 0.05 square inches or less.

18. The method of claim 1, wherein the sheet form material comprises a loop material.

19. The method of claim 1, wherein the sheet-form material comprises a non-woven fabric.

20. The method of claim 1, wherein the sheet-form material comprises a reinforcing scrim.

21. The method of claim 1, wherein the sheet-form material is porous.

22. The method of claim 1, wherein the sheet-form material comprises paper.

23. The method of claim 1, wherein the sheet-form material comprises foam.

24. The method of claim 1, wherein the multiplicity of fastener elements are molded using a molding roll defining a plurality of cavities therein, the molten resin being introduced into the cavities of the molding roll.

25. The method of claim 24, wherein the cavities are hook-shaped such that the molding roll molds a multiplicity of hook-shaped fastener elements.

26. The method of claim 24, wherein the cavities are stem-shaped such that the molding roll molds a multiplicity of stem-shaped fastener elements.

27. The method of claim 26, further comprising passing the stem-shaped fastener elements through a forming roll to create fastener elements having a stem and a substantially mushroom-shaped top.

28. The method of claim 24, wherein the molten resin is introduced into the cavities of the molding roll using a counter rotating pressure roll positioned adjacent to the molding roll.

29. The method of claim 24, further comprising stripping the fastener elements from the molding roll.

30. The method of claim 24, wherein the molten resin is introduced into the cavities of the molding roll by injecting the molten resin directly onto the molding roll.

31. The method of claim 24, wherein the resin is bonded to the sheet-form material by pressure applied to the resin by the molding roll.

32. A method of producing a fastener product having a multiplicity of fastener elements extending from a sheet-form material, the method comprising:
    extruding molten resin through an extruder having an extrusion nozzle;
    intermittently injecting gas into the molten resin to create one or more discrete boluses of molten resin within the extrusion nozzle;
    depositing the discrete boluses of molten resin onto a moving sheet-form material to create a plurality of discrete regions of molten resin thereon, the discrete regions of resin being separated longitudinally along the sheet-form material;
    feeding the sheet-form material and discrete regions of molten resin thereon into a nip between a molding roll and a counter rotating pressure roll to introduce the resin into hook-shaped cavities defined in a circumferential surface of the molding roll to form a multiplicity of fastener elements from each discrete region, and to permanently bond the resin to the sheet-form material; and
    stripping the resin from the hook-shaped cavities.

33. The method of claim 32, wherein the gas being injected into the molten resin is pressurized to at least about 300 psi.

34. The method of claim 33, wherein the gas is pressurized to between about 300 and 2500 psi.

35. The method of claim 32, wherein the gas is injected into the resin within the extrusion nozzle.

36. The method of claim 35, wherein the gas is injected into the resin within 2 inches of an outlet of the extrusion nozzle, the outlet being exposed to atmospheric pressure such that the resin is forced through the outlet.

37. The method of claim 32, wherein the gas comprises air.

38. The method of claim 32, wherein the gas comprises nitrogen.

39. The method of claim 32, wherein the gas is injected under pressure into the resin through an injection nozzle, the gas being injected at a uniform rate.

40. The method of claim 32, wherein the gas is injected into the molten resin at a frequency that corresponds to a longitudinal separation distance between the discrete regions of molten resin on the sheet-form material.

41. The method of claim 40, wherein the longitudinal separation distance is at least about 0.5 millimeters.

42. The method of claim 32, wherein an orifice plate is attached to the extruder at the outlet of the extrusion nozzle to provide for the extrusion of multiple discrete regions of resin.

43. The method of claim 32, wherein the extrusion nozzle defines a resin flow area of about 0.05 square inches or less.

44. The method of claim 32, wherein the molten resin is introduced into the cavities of the molding roll by injecting the molten resin directly onto the molding roll.

45. An apparatus for producing a fastener product having a multiplicity of fastener elements extending from a sheet-form material, the apparatus comprising:
    an extruder having an extrusion nozzle, the extruder containing a thermoplastic molten resin and extruding the resin through the extrusion nozzle, the nozzle directing the extruded resin onto the sheet-form material;
    a pressurized gas assembly having an injection nozzle connected to the extruder, the injection nozzle being in communication with the resin within the extruder, the gas assembly intermittently injecting pressurized gas into the resin within the extruder to interrupt flow of the resin through the extrusion nozzle to deposit discrete regions of the resin onto the sheet-form material;
    a molding device defining multiple cavities therein; and
    a pressure device positioned adjacent the molding device, the pressure device applying pressure to the sheet-form material and the discrete regions of the resin thereon to at least partially fill the cavities of the molding device with the discrete regions of the resin.

46. The apparatus of claim 45, further comprising an orifice plate attached to the extruder at the outlet of the extrusion nozzle to provide for the extrusion of multiple discrete regions of resin.

47. The apparatus of claim 45, wherein the extrusion nozzle defines a resin flow area of about 0.05 square inches or less.

48. The apparatus of claim 45, wherein the molding device comprises a molding roll.

49. The apparatus of claim 48, wherein the cavities are hook-shaped such that the molding roll molds a multiplicity of hook-shaped fastener elements.

50. The apparatus of claim 48, wherein the cavities are stem-shaped such that the molding roll molds a multiplicity of stem-shaped fastener elements.

51. The apparatus of claim 45, further comprising a forming roll to create fastener elements having a stem and a substantially mushroom-shaped top.

52. The apparatus of claim 45, wherein the pressure device comprises a counter rotating pressure roll positioned adjacent to the molding roll.

53. The apparatus of claim 45, further comprising a stripping roll for stripping the fastener elements from the molding roll.

54. The apparatus of claim 45, wherein the extruder is configured to extrude the molten resin directly onto the molding roll.

55. The apparatus of claim 45, wherein the pressure applied by the pressure device bonds the resin to the sheet-form material.

56. The apparatus of claim 55, wherein the extruder includes multiple extrusion nozzles.

* * * * *